United States Patent [19]

Porter et al.

[11] Patent Number: 5,153,039

[45] Date of Patent: * Oct. 6, 1992

[54] HIGH DENSITY POLYETHYLENE ARTICLE WITH OXYGEN BARRIER PROPERTIES

[75] Inventors: Jay P. Porter; William D. Ray, both of Baton Rouge, La.

[73] Assignee: Paxon Polymer Company, L.P., Baton Rouge, La.

[*] Notice: The portion of the term of this patent subsequent to Mar. 27, 2007 has been disclaimed.

[21] Appl. No.: 804,492

[22] Filed: Dec. 9, 1991

Related U.S. Application Data

[63] Continuation of Ser. No. 496,387, Mar. 20, 1990, abandoned.

[51] Int. Cl.$^5$ .................... C08K 3/34; B32B 9/04; B32B 13/04; B65D 1/00
[52] U.S. Cl. .................... 428/36.92; 428/35.7; 428/36.6; 428/36.8; 428/324; 428/331; 428/446; 428/449; 428/454; 428/521; 524/449; 524/451; 524/528
[58] Field of Search ............... 428/446, 331, 454, 449, 428/521, 35.7

[56] References Cited

U.S. PATENT DOCUMENTS

| | | | |
|---|---|---|---|
| 3,876,735 | 4/1975 | Bontinick | 264/22 |
| 3,879,492 | 4/1975 | Bontinick | 260/857 |
| 3,993,718 | 11/1976 | Bontinick | 264/22 |
| 4,082,880 | 4/1978 | Zboril | 428/220 |
| 4,229,504 | 10/1980 | Brachman | 524/449 |
| 4,237,176 | 12/1980 | Brueggemann | 428/219 |
| 4,435,466 | 4/1984 | Kuhnel | 428/215 |
| 4,447,479 | 5/1984 | Harrison | 428/35 |
| 4,499,227 | 2/1985 | Bailey | 524/399 |
| 4,518,654 | 5/1985 | Eichbauer | 428/331 |
| 4,528,235 | 7/1985 | Sacks | 428/220 |
| 4,604,421 | 8/1986 | Mitsuno | 524/449 |
| 4,618,528 | 10/1986 | Sacks | 428/216 |
| 4,696,857 | 9/1987 | Sibilia | 428/323 |
| 4,911,985 | 3/1990 | Jenkins | 428/446 |

FOREIGN PATENT DOCUMENTS 202637 11/1982 New Zealand .

*Primary Examiner*—Ellis P. Robinson
*Assistant Examiner*—Rena L. Dye
*Attorney, Agent, or Firm*—Roger H. Criss; Michael U. Lee

[57] ABSTRACT

An article of manufacture which includes a barrier layer formed of a high density polyethylene composition comprising:

from about 50 to about 95 weight percent of high density polyethylene;

from about 5 to 40 weight percent of polyisobutylene rubber; and from about 1 to about 30 weight percent of a filler selected from the group consisting of mica, talc and mixtures thereof, the barrier layer having excellent oxygen permeation resistance.

The article of manufacture may be a mono- or multi-ply layer, such as a blow-molded bottle.

14 Claims, No Drawings

HIGH DENSITY POLYETHYLENE ARTICLE WITH OXYGEN BARRIER PROPERTIES

This application is a continuation of application Ser. No. 496,387 filed Mar. 20, 1990, now abandoned.

CROSS-REFERENCE TO RELATED APPLICATION

This application is related to copending U.S. patent application Ser. No. 313,320, filed Feb. 21, 1989, now U.S. Pat. No. 4,911,985.

BACKGROUND OF THE INVENTION

1. Field of the Invention

This invention relates to blends of high density polyethylene, and products made therefrom.

2. Description of the Prior Art

Paper-like films of polyethylene containing mica filler have been proposed in U.S. Pat. No. 4,082,880 to Zboril. It has also been proposed in New Zealand Patent 202,637 to form envelopes from a coextrusion in which the outer layer is a mica-filled high density polyethylene and the inner layer is low density polyethylene.

In the above-mentioned patent application, there are disclosed compositions which include high density polyethylene, polyisobutylene rubber and a filler which is mica, talc or mixtures thereof. Such a composition is particularly useful for packaging applications, such as envelopes. Multi-layer films formed from such compositions have excellent tear strength and puncture resistance compared with films that only contain mica and high density polyethylene.

The industry has been searching for polyethylene compositions which exhibit excellent oxygen barrier properties such that containers can be prepared which protect the contained materials from the destructive effects of oxygen. Such containers include blow-molded mono- and multi-layer containers as well as films, which can be used to package such items as foodstuffs, medicines and the like.

SUMMARY OF THE INVENTION

In accordance with this invention, there is provided an article of manufacture comprising a barrier layer formed of a high density polyethylene composition comprising:
  from about 50 to about 95 weight percent of high density polyethylene;
  from about 5 to 40 weight percent of polyisobutylene rubber; and
  from about 1 to about 30 weight percent of a filler selected from the group consisting of mica, talc and mixtures thereof,
  the barrier layer having excellent oxygen permeation resistance.

Preferably, the barrier layer has an oxygen permeability of less than about 50 cc mil/100 in$^2$/24 hours atm.

It has been surprisingly discovered that compositions containing high density polyethylene, polyisobutylene and mica and/or talc filler exhibit excellent oxygen barrier properties. They also exhibit excellent moisture barrier properties and good physical properties so that they can be blow molded extruded or co-extruded into bottles, films or other containers.

DESCRIPTION OF THE PREFERRED EMBODIMENTS

The compositions of this invention are based on high density polyethylene. The term "high density" is well known in the art, and generally refers to densities in the range of about 0.94 to 0.965 grams per cubic centimeter. The term "polyethylene" as used herein includes homopolymers of ethylene and copolymers of at least about 85 weight percent ethylene with up to about 15 weight percent of one or more $C_3$ to $C_{10}$ alpha-olefins, such as 1-butene, 1-hexene, etc. Preferably, the copolymers include from about 0.1 to about 3 weight percent of the alpha-olefin comonomer.

The compositions of this invention comprise about 50 to about 95 weight percent of high density polyethylene, and preferably about 60 to about 85 weight percent. All weight percents given herein are based on the total weight of the composition. The polyethylene preferably has a melt flow index, measured by the procedures of ASTM D-1238, condition E, of about 0.1 to about 100 decigrams per minute, more preferably about 0.5 to 3 decigrams per minute.

The polyisobutylene rubber preferably has a molecular weight in the range of 750,000 to 2,500,000. The molecular weight is determined from intrinsic viscosity in disobutylene at 20° C. The polyisobutylene may be of the type used in rubber modified high density polyethylene film resin.

The polyisobutylene is present in the compositions of this invention in amounts ranging from about 3 to about 40 weight percent, preferably about 5 to about 20 weight percent, more preferably about 10 to about 20 weight percent.

The fillers used in the present compositions include mica, talc and mixtures thereof. The mica preferably is in the form of particles of the size in the range of about 1.9 to 88 microns. Talc (or micaceous talcum) can also be employed as the filler in the compositions of this invention. The talc is preferably in the form of particles of a size in the range of about 0.5 to 50 microns. It is also possible to utilize blends of mica and talc as the filler. The fillers may be uncoated or coated with, for example, a silane material.

The fillers of this invention are employed in amounts ranging from about 1 to about 30 weight percent, preferably about 3 to 15 percent.

The compositions of this invention can be prepared by any conventional technique. They can be dry or melt blended, in one or more steps. Preferably, the compositions are melt blended in a Banbury or similar mixer.

As mentioned above, the compositions are useful as an oxygen-barrier layer in containers, films and the like. Subsequent to blending of the compositions, they can be blow molded as mono- or multi-layer films or containers such as bottles, drums, and the like, which may be formed by conventional blow-molding or extrusion techniques. In typical multi-layer constructions, the oxygen-barrier layer of this invention may form the inner, center or outer layer.

As used herein, the term "article" is used in a broad sense to encompass that which is formed, molded, extruded, co-extruded, thermoformed, laminated, blow-molded, and the like from the compositions of this invention, into a variety of sizes, shapes, thickness, and so on, whether it be film, sheet, containers, bottles, cans, vessles, coextrusions, laminations, multiple constructions and the like.

Articles made in accordance with the present invention have excellent oxygen barrier properties, as well as physical properties such as stiffness. The compositions may also be used to form a lamination layer between two or more thermoplastic layers of film or sheet, including such polymers as low density polyethylene, linear low density polyethylene, polypropylene and the like.

Resins which are suitable for blending and forming laminates or co-extruded articles in conjunction with the compositions of this invention include one or more of the following: olefin polymers and copolymers, polyamides, polyesters, polycarbonates and the like.

The above-described articles of the present invention exhibit excellent oxygen permeability resistance. The permeability resistance is preferably less than about 50 cc mil/100 in$^2$ 24 hrs atm. and more preferable is less than about 20, most preferable less than about 10 cc mil/100 in$^2$ 24 hrs atm.

Articles formed from the compositions of this invention are ideally suited to protect foodstuffs, medicines, combustibles, herbicides and the like.

The articles also exhibit excellent water vapor resistance.

The following non-limiting examples are given to further illustrate the present invention.

EXAMPLE 1

A blend of high density polyethylene, mica and polyisobutylene was prepared by melt blending the ingredients in a Banbury mixer. The mixture contained 70% by weight of high density polyethylene (melt index of 0.7 dg/min), 13% by weight white mica (particle size of about 44 microns) and 17% by weight of polyisobutylene (molecular weight of about 1,660,000) in a weight ratio of 66:34 polyethylene to polyisobutylene. The mixture also contained 500 ppm of Irganox 1010 antioxidant. Irganox 1010 is tetrakis [methylene 3-(3,5 di-tertiary butyl 4-hydroxyphenyl) propionate] methane made by Ciba-Geigy.

The ingredients were blended at 177° C. in the Banbury mixer for a time sufficient to provide a homogeneous blend. The composition was pelletized and the pellets were introduced into a Sterling extruder having a 1.5 inch (38 mm) diameter circular die with a blow-up ratio of 2:1. The resulting film was cooled and taken up on a roll. The composition had a melt index (I$_2$) of about 0.3 dg/min and a density of about 1.02 g/cc.

The film had a flexural stiffness of 174,094 psi (1,200 MPa). This compared well with a film produced from a high density polyethylene (not containing the polyisobutylene or mica) of a 0.960 density and 0.7 melt index, which had a flexural stiffness of 145,000 psi (1,000 MPa).

EXAMPLE 2

The composition of Example 1 was formed into a monolayer film by feeding it to 1¾ inch (44 mm) Sterling blown film extruder.

The extrusion temperatures were as follows: feed—325° F. (163° C.), transition—350° F. (177° C.) and barrel and die—400° F. (204° C.). The film die was 4 inches (102 mm) and a layflat film of 12 inches (305 mm) was prepared. Films of various thicknesses were formed and the films tested for oxygen permeation resistance in accordance with ASTM D-1434-75. The results are indicated in Table 1 below.

TABLE 1

| | Monolayer Film |
|---|---|
| Thickness (mils) | Oxygen Resistance (cc/100 in$^2$/24 hr atm.) |
| 2.8 | 7.8 |
| 3.1 | 7.4 |
| 3.5 | 7.0 |
| 4.8 | 3.0 |

EXAMPLE 3

The composition of Example 1 was formed into a blown coextrusion film by feeding it and linear low density polyethylene (LLDPE) to a Killion coextruder (with screws of 1 inch (25 mm), 1.5 inch (38 mm) and 1 inch (25 mm)) and an L/D ratio of 24:1, fitted with a 2 inch (51 mm) die. The temperatures were as follows: Zone 1—350° F. (177° C.); Zone 2—370° F. (188° C.); Zone 3—400° F. (204° C.) and the die and adaptor—450° F. (232° C). The LLDPE had a density of 0.92 g/cc and a melt index of 1.0. A 7 inch (178 mm) layflat film was produced, with the composition of this invention being located between outer layers of the LLDPE.

The multi-layer film was tested for its oxygen permeation resistance as well as water vapor transmission rate in accordance with ASTM E-96-66(E) at 100° F. (38° C.), 90% RH. The results are shown in Table 2 below for films of different thicknesses.

TABLE 2

| | Blown Coextruded Film | |
|---|---|---|
| Thickness, mils (LLDPE/HDPE/LLDPE) | O$_2$ Resistance (cc/100 in$^2$/24 hrs atm.) | WVTR* (gm/m$^2$/ 24 hrs) |
| 1.7/1.0/1.7 | 70 | 2.7 |
| 1.4/2.0/1.4 | 48 | 1.7 |
| 1.5/3.0/1.5 | 22 | 1.0 |

*water vapor transmission rate

EXAMPLE 4

The composition of Example 1 was formed into one quart size blown monolayer bottles by feeding the composition to an extrusion blow molding machine. The bottles had a wall thickness of about 35 mils.

Bottles that were initially made were ground up and re-fed to the extruder. These bottles were then also ground up and 30% by weight of the regrind was blended with 70% by weight of the composition of Example 1 in forming the bottles that were tested.

The bottles were tested for oxygen permeation, WVTR and caron dioxide permeation. The results are listed in Table 3 below.

TABLE 3

| | Blown Monolayer Bottles | |
|---|---|---|
| O$_2$ Resistance (cc/ 100 in$^2$/24 hrs atm.) | WVTR (gm/m$^2$/24 hrs) | CO$_2$ Resistance (cc/ 100 in$^2$/24 hrs atm.) |
| 7.5 | 0.02 | 0.6 |

EXAMPLES 5–10

Compositions similar to the composition of Example 1 were produced and the physical properties of monolayer blown film (extruded through a 1.5 inch (38 mm) extruder with a 3 inch (76 mm) die) made from such compositions were tested for their physical properties.

The results are given in Table 4 below.

TABLE 4

| | | Blown Monolayer Film | | | | | |
|---|---|---|---|---|---|---|---|
| | | Ex. 5 | Ex. 6 | Ex. 7 | Ex. 8 | Ex. 9 | Ex. 10 |
| Tensile Strength | M.D. | 1898 | 1857 | 1915 | 1926 | 1928 | 1964 |
| @ Yield (PSI) | T.D. | 1480 | 1453 | 1491 | 1497 | 1508 | 1689 |
| Tensile Strength | M.D | 1560 | 1400 | 1892 | 1617 | 1786 | 1150 |
| @ Break (PSI) | T.D. | 1219 | 1079 | 700 | 809 | 622 | 1178 |
| Elongation @ Yield | M.D. | 18.1 | 17.7 | 17.8 | 19.6 | 17.1 | 17.3 |
| (%) | T.D. | 4.4 | 5.2 | 4.2 | 6.3 | 4.2 | 4.4 |
| Elongation @ Break | M.D. | 47.6 | 41.7 | 53.0 | 46.0 | 46.8 | 53.3 |
| (%) | T.D. | 14.4 | 11.0 | 17.3 | 14.4 | 20.2 | 15.2 |
| 1% Secant Modulus | M.D. | 74030 | 71950 | 74860 | 75040 | 74080 | 74550 |
| (PSI) | T.D. | 57490 | 45890 | 39160 | 46880 | 39460 | 44670 |
| Elmandorf Tear | M.D. | 12.2 | 10.8 | 12.2 | 12.4 | 12.0 | 14.0 |
| Strength (G/Mil) | T.D. | 12.9 | 13.3 | 11.7 | 13.1 | 11.1 | 11.8 |
| Dart Impact (Grams) | | <35 | <35 | <35 | <35 | <35 | <35 |
| Thickness (Mils) | | 2.37 | 2.19 | 2.17 | 2.18 | 2.21 | 2.44 |
| C.O.F. | | | | | | | |
| (Static) | M.D. | .26 | .23 | .26 | .29 | .26 | .23 |
| | T.D. | .28 | .27 | .25 | .27 | .28 | .23 |
| (Kinetic) | M.D. | .26 | .22 | .29 | .26 | .22 | .21 |
| | T.D. | .27 | .24 | .25 | .27 | .25 | .23 |
| $MI_2$ | | .37 | .40 | .38 | .36 | .36 | .37 |
| $MI_{10}$ | | 6.97 | 7.54 | 7.21 | 7.09 | 6.84 | 7.12 |
| Density (g/cc) | | 1.0356 | 1.0349 | 1.0360 | 1.0351 | 1.0369 | 1.0368 |

Note: M.D. = Machine Direction, T.D. = Transverse Direction

The compositions of this invention are homogeneous blends of the three main ingredients. The compositions may include conventional additives, such as heat stabilizers, pigments (such as titanium dioxide, carbon black, and the like), antioxidants, antistatic agents, extrusion aids, UV stabilizers, etc.

When compared with high density polyethylene compositions without the rubber and filler, as well as compositions with the rubber but without the filler, the compositions of the present invention demonstrate improved oxygen permeation resistance. This is shown, for instance, in the following example.

EXAMPLE 11

Films of 4 mils thickness were produced from the following compositions: A—the composition of Example 1; B—a composition containing high density polyethylene having a density of 0.940 g/cc and containing 34% by weight of the rubber used in Example 1, but no mica; C—a composition containing high density polyethylene having a density of 0.950 g/cc and containing 25% by weight of the rubber used in Example 1, but no mica; and D—a composition containing high density polyethylene having a density of 0.960 g/cc and containing no rubber or mica.

The results are shown in Table 5 below:

TABLE 5

| Comparative Compositions | |
|---|---|
| Composition | Oxygen Resistance (cc/100 in²/24 hr atm.) |
| A | 5 |
| B (Comparative) | 35 |
| C (Comparative) | 41 |
| D (Comparative) | 309 |

It can be seen that the present invention provides articles formed from high density polyethylene compositions that have excellent oxygen barrier properties. The oxygen barrier resistance is achieved without a detrimental affect on the other desirable physical properties.

We claim:

1. An article of manufacture comprising a barrier layer formed of a high density polyethylene composition consisting of in weight percent based on the total weight of the composition:
   from about 50 to about 95 weight percent of high density polyethylene;
   from about 5 to about 40 weight percent of polyisobutylene rubber; and
   from about 1 to about 30 weight percent of a filler selected from the group consisting of mica, talc and mixtures thereof,
   the barrier layer having an oxygen permeability of less than about 50 cc. mil/100 in.² 24 hrs. atm.

2. The article of manufacture of claim 1, wherein said filler is mica.

3. The article of manufacture of claim 2, wherein said polyisobutylene rubber has a molecular weight of about 750,000 to 2,500,000 as determined from the intrinsic viscosity in disobutylene at 20° C.

4. The article of manufacture of claim 3, consisting of from about 60 to 85 weight percent of high density polyethylene, 5 to 20 weight percent polyisobutylene and 3 to 15 weight percent mica.

5. The article of manufacture composition of claim 1, consisting of from about 60 to 85 weight percent of high density polyethylene, 5 to 20 weight percent polyisobutylene and 3 to 15 weight percent mica.

6. The article of manufacture of claim 1, wherein said filler is talc.

7. The article of manufacture of claim 1, wherein said barrier layer has an oxygen permeability of less than about 20 cc. mil/100 in.² 24 hrs. atm.

8. The article of manufacture of claim 1, wherein said article is in the form of a container.

9. The article of manufacture of claim 8, wherein said container is blow-molded.

10. The article of manufacture of claim 9, wherein said container is a bottle.

11. The article of manufacture of claim 1, wherein said article is in the form of a film or sheet.

12. The article of manufacture of claim 11, wherein said film or sheet is a multi-ply construction.

13. A blow molded bottle comprising a barrier layer formed of a high density polyethylene composition consisting of in weight percent based on the total weight of the composition:

from about 50 to about 95 weight percent of high density polyethylene;

from about 5 to about 40 weight percent of polyisobutylene rubber; and from about 1 to about 30 weight percent of a filler selected from the group consisting of mica, talc and mixtures thereof, the barrier layer having an oxygen permeability of less than about 50 cc. mil/100 in.$^2$ 24 hrs. atm.

14. A method for improving the oxygen permeation resistance of articles of manufacture formed from a high density polyethylene composition, said method consisting of adding to a high density polyethylene resin, in weight percent based on the total weight of the composition, from about 5 to about 40 weight percent of polyisobutylene rubber and from about 1 to about 30 weight percent of a filler selected from the group consisting of mica, talc and mixtures thereof, said polyethylene resin consisting of from about 50 to about 95 percent by weight of said composition, wherein articles of manufacture formed from said composition have an oxygen permeability of less than about 50 cc. mil/100 in.$^2$ 24 hrs. atm.

* * * * *